United States Patent [19]
Grieb

[11] 3,886,737
[45] June 3, 1975

[54] TURBOJET ENGINES OF MULTI-SHAFT AND MULTI-FLOW CONSTRUCTION

[75] Inventor: Hubert Grieb, Unterpfaffenhofen, Germany

[73] Assignee: Motoren-und Turbinen-Union Munchen GmbH, Germany

[22] Filed: Aug. 22, 1973

[21] Appl. No.: 390,485

[30] Foreign Application Priority Data
Aug. 22, 1972  Germany............................ 2241283

[52] U.S. Cl........ 60/226 R; 181/33 HB; 181/33 HC
[51] Int. Cl............................................. F02k 3/06
[58] Field of Search...... 60/224, 226 R, 226 A, 262, 60/263, 271; 239/265.13; 181/33 HB, 33 HC, 33 HD

[56] References Cited
UNITED STATES PATENTS

| | | | |
|---|---|---|---|
| 2,934,889 | 5/1960 | Poulos............................ | 181/33 HC |
| 2,944,623 | 7/1960 | Bodine ........................... | 181/33 HB |
| 3,182,898 | 5/1965 | Hewson........................... | 60/226 R |
| 3,308,625 | 3/1967 | Shaw............................... | 60/263 X |
| 3,463,402 | 8/1969 | Langston........................ | 181/33 HD |
| 3,477,231 | 11/1969 | Paulson........................... | 60/226 R |
| 3,481,427 | 12/1969 | Dobbs et al..................... | 60/226 R |
| 3,542,152 | 11/1970 | Adamson et al................. | 60/226 R |
| 3,599,749 | 8/1971 | Millman......................... | 181/33 HC |
| 3,713,748 | 1/1973 | Langley.......................... | 415/79 X |

OTHER PUBLICATIONS

Butz, J. S., "NACA Studies Ways to Soften Jet Noise", Aviation Week, Nov. 4, 1957, pp. 73, 75, 77.
Gordon, B. J., "Review of Work in Jet Engine Noise Control," Noise Control, May/June 1961, pp. 14–21.

Primary Examiner—C. J. Husar
Assistant Examiner—Robert E. Garrett
Attorney, Agent, or Firm—Craig & Antonelli

[57] ABSTRACT

A turbojet engine constructed for minimizing noise level generation which includes two separate annular concentric bypass air ducts extending around the hot exhaust gas stream from the combustion chamber. The fans energizing the respective annular ducts and the ducts themselves are configured such that the exit velocity for the annular bypass air ducts is decreased from the longitudinal centerline of the engine outwardly in a manner corresponding approximately to the velocity profile of the turbulent free jet formed downstream of the propulsion nozzle arrangement. Additional silencing means are provided within the duct and between the fans. Further silencing measures include specific arrangement of splitters for the flow through the various ducts from the more forward fans as well as specific configuration of the fan blades to minimize sound generation from the fan blades themselves.

38 Claims, 7 Drawing Figures

PATENTED JUN 3 1975 3,886,737

SHEET 2

TURBOJET ENGINES OF MULTI-SHAFT AND MULTI-FLOW CONSTRUCTION

BACKGROUND AND SUMMARY OF THE INVENTION

This invention related to turbojet engines of multi-shaft and multi-flow construction.

The sources of sound in conventional two-duct engines are essentially jet noise, fan noise and turbine noise.

The causes of jet noise may be considered in light of the following causal relationships: The gas jet issuing at a relatively high velocity from the primary nozzle or hot duct is enveloped by the slower, fan-generated annular jet from the cold duct. At the interface between hot and cold jets and again between cold jet and surrounding atmosphere, turbulences are caused which may be viewed as sources of sound. Emission of sound is a maximum between the nozzle and the point of dissolution of the jet core where the jet velocity is equal to that at the nozzle, because it is in this area that the velocity gradients vertically or transverse to the jet axis which are the determinants of turbulence, are greatest. The jet cores are formed at the nozzle exit and slope pointwise towards the rear due to the mixing with the adjacent ambient or other air and the thus increased dissolution of the jet cores. The term "turbulent free jet" depicts the total mixture jet composed of mass streams from a plurality of ducts, including by suction, absorbed ambient air, and particularly downstream of cores 34, 35 (FIG. 5). The outer edges of this turbulent free jet is depicted at 38 in FIG. 5.

The jet forming with a typical velocity turbulent free jet profile downstream of the jet core (turbulent free jet) likewise constitutes a source of sound but is less significant than the just cited sources of sound because the emission of sound is approximately proportional to the mass and the eighth power of the mean velocity. In the area downstream of the jet core the mean velocity has already been diminished by the ambient air drawn into the jet so that the sound generation is likewise diminished.

The important aspects or factors of fan noise are these: The fan noise issuing from the engine in a forward direction will be the greater, the greater the pressure ratio and the throughput of the fan. With two-duct engines of high bypass ratio a single stage will normally be sufficient to energize the cold duct. Thermodynamic considerations then generally compel a high stage pressure ratio which, together with the very large air flow, results in intense emission of sound. The engine intake ahead of the fan grants virtually unimpeded passage to the sound radiated in a forward direction. The sound radiated aft by the outer portion of the fan exits freely through the bypass duct and associated nozzle. Forward emission of sound from the succeeding compressor stages in the hot duct is already appreciably attenuated by the fan. The paramount consideration, therefore, is the sound emitted by the fan proper.

The turbines generate noise in analogously the same fashion as the compressors, and this noise exits aft through the hot nozzle.

Where two-duct engines have low bypass ratios, the noise radiated aft is generally predominantly jet noise and less so fan and turbine noise, while with two-duct engines of high bypass ratios the aft noise is mostly fan noise and less so turbine and jet noise.

Suitable fan design and noise-attenuating provisions in the engine intake and the bypass duct alike will serve to dampen the fan noise front and aft, but the benefits of such measures are closely limited and by no means provide a basic solution to the noise problem.

It has been contemplated to reduce noise by providing means for the rapid mixing of the hot with the cold jet and so slightly dampen the jet noise. This rapid mixing will disadvantageously be attended by thrust losses, however.

It is contemplated by the present invention to provide a turbojet engine which by the particular arrangement and constellation of its components emits appreciably less noise than conventional turbojet engines of two-flow construction.

It is further contemplated by the present invention to provide a multi-flow, multi-shaft turbojet engine where the total propulsive jet is broken down in several fractional flows which in approximate adaptation to the optimum profile of the turbulent free jet have ever lower jet velocities, where the hot gas flow is fastest and the velocity diminishes towards the outside.

Regarding the reduction in jet noise, the present invention further contemplates breaking down the propulsive jet by enveloping or surrounding the hot primary jet with two annular jets of graduated velocities and so produces smaller differences in jet velocities in the resultant three interfaces than would prevail with the analogous interfaces of a two-duct engine, with the basic design parameters of a two or three-duct engine (turbine inlet temperature, pressure ratio in hot duct, total mass flow and thrust) remaining unchanged. The sound emitted from the interfaces approximately follows the law.

$$\text{acoustic power} \sim D^2(C_+^2 - C_-^2)^4,$$

where $D$ is the diameter at the interface and $C_\pm$ are the velocities of the adjacent jets. With the proposed three-duct engine, therefore, a considerable reduction in jet noise is anticipated and obtained, because the parameters $C_\pm$ are effectively lowered with a corresponding exponential reduction in jet noise.

The present invention contemplates producing the jet profile characterizing the turbulent free jet by suitably distributing the total pressure, etc. already at the nozzle so as to achieve the smallest velocity gradients vertically to the jet axis and thus minimize the emission of sound at given design parameters (air flow, specific thrust). However, since such a jet profile would be impractical due to constructional problems, etc., preferred embodiments of the present invention only approximate such a jet profile with three separate propulsion flow ducts.

In the interest of reduced fan noise the present invention further contemplates advantageously providing that the velocity profile of the propulsive jet of the three-duct engine bases on a higher fan pressure ratio for the second duct and a lower fan pressure ratio for the third duct as contrasted with the relative pressure ratios for conventional two-duct engines. Since, with the proposed engine the fan energizing the third duct can be designed independently of the other compressors and, therefore, also for best results acoustically, the level of fan noise is then sure to be lower than with an equivalent two-duct engine. With the proposed engine the pressure ratio of the fan for the third duct can normally be kept low enough to minimize if not obviate additional measures to dampen noise.

In accordance with preferred embodiments contemplated by this invention the noise radiated forward and aft by the second fan which energizes the first and second ducts and is designed for a higher pressure ratio at a substantially reduced mass flow is counteracted as follows:

The noise radiated forward by the second fan is reduced by a silencer installed between the first and the second fan.

The space provided between the first and the second fan to accommodate the silencer prevents an increase in the noise generated by the second fan, which increase might otherwise result from interference with flow disturbances emanating from the first fan.

The noise radiated forward by the second fan is partially checked and thus alleviated by the inner portion of the blading of the first fan.

As the sound radiated forward by the second fan is passing through the inner portion of the first fan, additional attenuation can be achieved according to the present invention by conforming the blade ducts in the inner portion of the first fan such that the mach numbers of the relative flow through the throat area run around 0.7 to 0.8.

The noise radiated aft by the second fan is reduced by a silencer arranged in the duct of the second flow.

The multi-flow engines contemplated by this invention lend themselves far better than an approximately equivalent two-duct engine to use with acoustic silencers to alleviate the noise radiated from the second fan, for the following reasons:

The smaller the radial dimensions of the bypass duct, the smaller the necessary technical effort at the desired ratio of length to height of duct of the silencer, which ratio is a prime determinant of its effectiveness.

The smaller the height of duct relative to the wave length of the radiated sound, the more effective the damping action at a given technical effort for acoustic silencers.

The higher the pressure ratio of the preceding fan, the lower the thrust losses resulting from the pressure loss through the silencer.

The smaller the quantity of air flowing through the silencer — relative to the total flow through the three-duct engine — the smaller the loss in thrust of the entire engine.

These and further objects, features and advantages of the present invention will become more obvious from the following description when taken in connection with the accompanying drawings which show, for purposes of illustration only, several embodiments in accordance with the present invention.

DETAILED DESCRIPTION OF THE DRAWINGS

Figure 1:
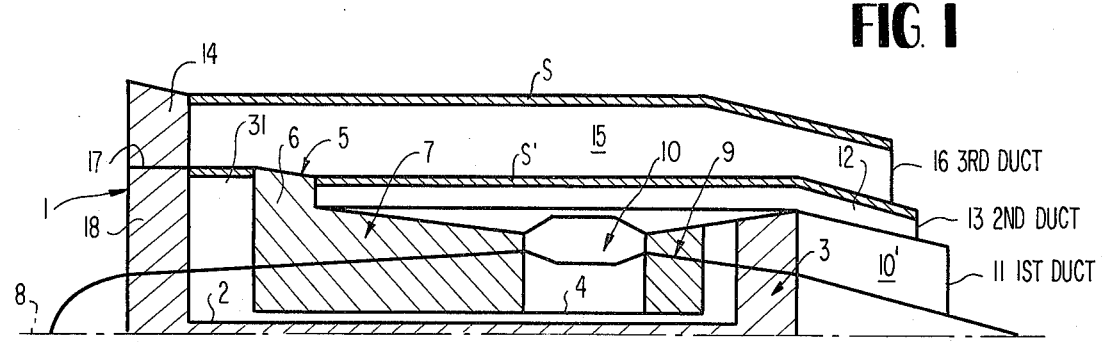
FIG. 1 is a schematic longitudinal sectional view illustrating the upper half of a turbojet engine constructed in accordance with a first embodiment of the present invention.

In the drawings, like reference characters are used for like features in the various figures. The turbojet engine of FIG. 1 includes — read from left to right — a front fan 1 which is connected to and driven by a low-pressure turbine 3 through an inner shaft 2. The front fan 1 is succeeded by a second fan 5 which connects to the high-pressure system through a tubular shaft 4. The second fan 5 is here exemplified by outwardly extended blade portions 6 at the inlet of the high-pressure compressor 7 which is connected to and driven by a high-pressure turbine 9 through a tubular shaft 4 which extends coaxially with the longitudinal centerline of the engine and envelopes the inner shaft 2. A combustion chamber system arranged coaxially with the longitudinal centerline 8 of the engine is indicated by the numeral 10.

The hot gas escaping from the low-pressure turbine 3 enters an annular duct 10' arranged coaxially with the longitudinal centerline 8 of the engine and isuses through a hot gas nozzle 11 (first duct).

The air discharged by the outer portion 6 of the second fan 5 flows through an annular duct 12 arranged coaxially with the longitudinal centerline 8 of the engine and exits through an annular nozzle 13 (second duct).

The air discharged by the outer portion 14 of the front fan 1 flows through a further annular duct 15, which extends coaxially with the longitudinal centerline 8 of the engine and envelopes the annular duct 12, and exits through an outlet nozzle 16 (third duct).

The outer portion 14 of the front fan 1 is suitably arranged on a splitter 17. The inner portion 18 arranged below or radially inward of this splitter 17 is either inactive aerodynamically or designed as a charge compressor of low pressure ratio.

Figure 2:
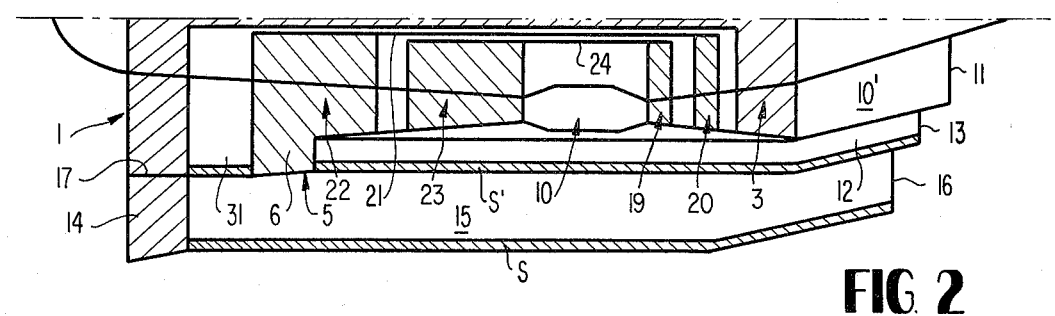
FIG. 2 is a schematic longitudinal sectional view illustrating the lower half of a turbojet engine constructed in accordance with a second embodiment of the present invention.

The engine of FIG. 2 differs from the engine of FIG. 1 mainly in that the engine illustrated is of three-shaft construction where an intermediate-pressure turbine 20 is interconnected between the high-pressure turbine 19 and the low-pressure turbine 3. The intermediate-pressure turbine 20 drives, through a tubular shaft 21 which extends coaxially with the longitudinal centerline 8 of the engine and envelopes the inner shaft 2, a compressor 22 which takes the shape of a charge or intermediate-pressure compressor and, coupled therewith, a second fan 5 here formed by extended blade portions 6. The remaining portion of the air compressed by the compressor 22 (other than that through blade portions 6 and duct 12) is directed to the high-pressure compressor 23 downstream, which connects to the high-pressure turbine 19 through an outer tubular shaft 24.

Figure 3:
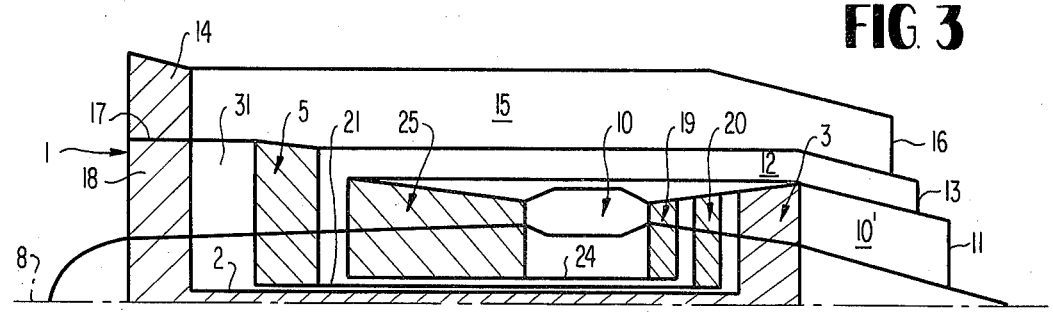
FIG. 3 is a schematic longitudinal sectional view illustrating the upper half of a turbojet engine constructed in accordance with a third embodiment of the present invention.

The turbojet engine shown in FIG. 3 differs from that in FIG. 2 essentially in that the high-pressure compressor 25 coupled with the high-pressure turbine 19 through the tubular shaft 24 has a greater number of stages and is preceded immediately by the second fan 5 which thus concurrently operates as a charge compressor for the high-pressure compressor 25.

Figure 4:
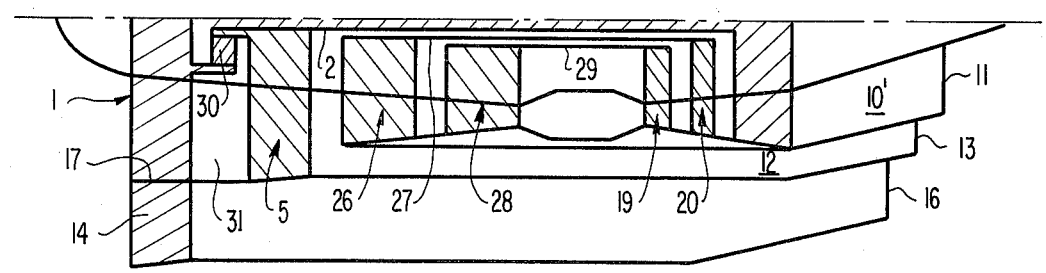
FIG. 4 is a schematic longitudinal sectional view illustrating the lower half of a turbojet engine constructed in accordance with a fourth embodiment of the present invention.

The turbojet engine shown in FIG. 4 differs from that in FIG. 3 mainly in that the place of the multi-stage high-pressure compressor 25 (FIG. 3) is taken by two, mechanically independent (freely rotatable with respect to one another) compressors each having a lesser number of stages, namely, the intermediate-pressure compressor 26 which is driven by the intermediate-pressure turbine 20 through a tubular shaft 27 and the high-pressure compressor 28 which is driven by the high-pressure turbine 19 through the outer tubular shaft 29. In the engine arrangement of FIG. 4 the compressors 26 and 28 may optionally be combined into a single compressor driven by a single (turbines 19 and 20 combined) turbine.

The engine in FIG. 4 further differs from that in FIG. 3 in that the fan 5 which energizes both the first duct (basic engine) and the second duct (annular duct 12) is directly connected to the inner shaft 2. In further departure from FIG. 3 the engine in FIG. 4 uses a reduction gear 30 between shaft 2 and fan 1 to drive the front fan 1.

FIGS. 1 through 4 illustrate that the inventive concepts of the present invention embrace many design alternatives for jet engines. The design principles germane to noise emission according to the present invention are here summarized as follows:

The front fan 1 (FIGS. 1 to 4) is preferably fitted with the splitter 17 to separate the mass flow entering the first and second ducts from the mass flow entering the third duct. The blade portion 18 arranged within (radially inwardly of) this splitter is then essentially inactive aerodynamically or designed for a very modest pressure ratio and serves chiefly to support the splitter and the outer blade portion 14. The blades 14 outside the splitter operate to produce the low pressure ratio required by the third duct. A special advantage provided by the construction illustrates in FIGS. 1 to 4 lies in the relatively small output of the front fan 1 — compared with the fan output of an equivalent two-duct engine — so that when an arrangement is selected in accordance with FIGS. 1 to 3, a low-speed low-pressure turbine 3 can be achieved at a moderate technical effort. Also, when the arrangement in FIG. 4 is adopted, the reducing gear 30 transmits relatively little power so that, again, the construction will be less complex than the reducing provisions for the fan of an equivalent two-duct engine.

The present invention also contemplates embodiments with the splitter eliminated. Then when it is assumed that the pressure ratio to suit the third duct is maintained over the entire flow area, the blade tip speed and with it the noise level may have to be increased so as to allow for the area near the hub. Also, when the splitter is eliminated, the previously described advantage of reduced power absorption is partially lost. However, other advantages of the invention described herein would be present in engines without the splitter.

When the inner blade portion 18 of the front fan 1 is designed accordingly (and in accordance with the present invention), the arrangement of FIGS. 1 to 4 provides further attenuation of the sound radiated forward from the second fan 5 in either construction; i.e., with or without splitter.

Having regard to the second fan 5 the alternative constructions are summarized as follows:

The second fan 5 can be coupled with the core engine as per FIG. 1.

The second fan 5 can be succeeded by further stages which operate in the hot duct only (FIG. 2).

The second fan 5 can be arranged on an independent shaft (FIG. 3).

The first fan 1 can be coupled with the second fan 5 through a reduction gear 30 such that the low-pressure turbine 3 driving both fans 1, 5 can be designed for relatively high speed or with a moderate number of stages (FIG. 4).

In accordance with FIGS. 1 to 4, acoustic silencers (see FIG. 1 for schematically depicted silencers S, S') may be arranged in the annular ducts 12, 15 and 31. The use of acoustic silencers to alleviate the noise from the second fan 5 is especially desirable in the ducts 12 and 31. Specific silencers have not been illustrated, however they could include sound absorbing materials within or on the duct walls or the like. Various silencer arrangements of known construction could be selected by one skilled in the art, given the present disclosure, in conjunction with the present invention.

Figure 5:
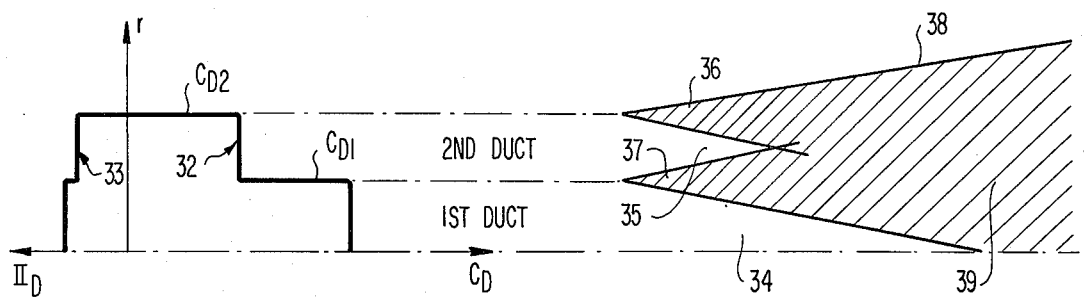
FIG. 5 is a diagram schematically depicting the jet flow and associated velocity profile and pressure ratios for a conventional two duct turbojet engine.
Figure 6:
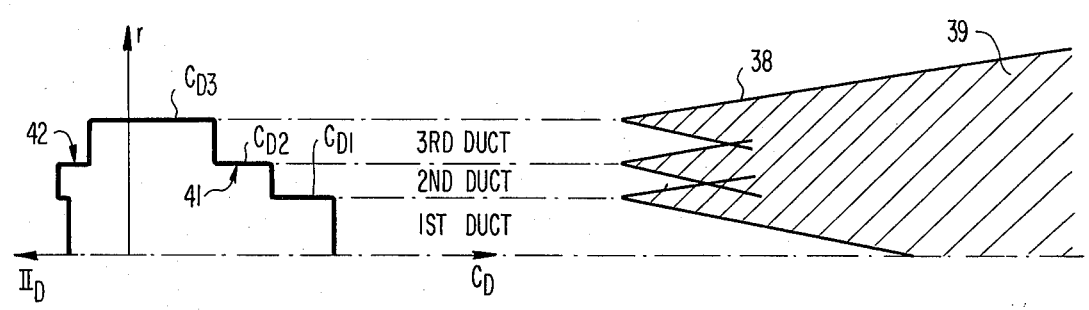
FIG. 6 is a diagram, similar to FIG. 5, but schematically depicting the jet flow and associated velocity profile and pressure ratios for a three-duct turbojet engine constructed in accordance with the present invention.

Using a diagrammatic representation of a conventional two-duct engine (FIG. 5) and a diagrammatical representation of a three-duct engine arranged in accordance with this invention, FIGS. 5 and 6 illustrate the origin of the jet noise produced by the respective engines and the effects of the total propulsive jet when mixing with the ambient air.

Figure 7:
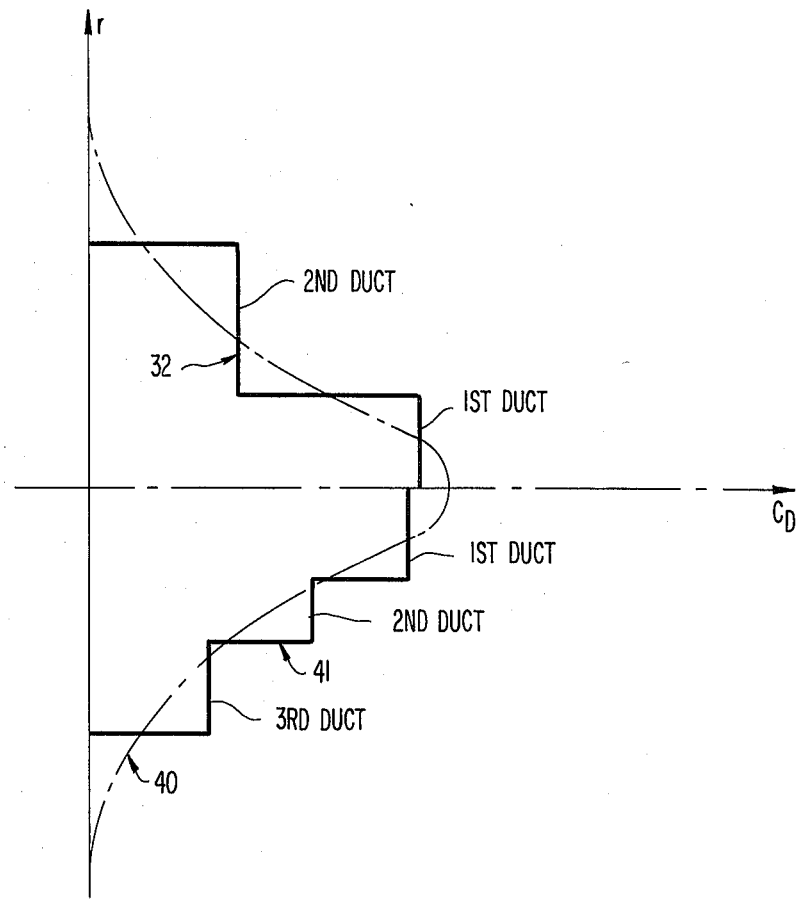
FIG. 7 is a diagram comparing the respective velocity profiles adjacent the nozzle of a two duct engine with a three duct engine constructed in accordance with the present invention and with an optimum turbulent free jet velocity profile.

On the diagram in FIG. 5, "r" indicates the common plane for the turbulent free jet from FIG. 7 as projected into the nozzle area of the engine.

Contour line 32 characterizes the stepped jet profile at the nozzle, where the jet velocity from the first duct (hot gas stream) is indicated by $C_{D1}$ and that from the second duct with $C_{D2}$. The pressure ratio relating to the first and the second duct may be gathered from the analogously stepped contour line 33. The numerals 34 and 35 indicate the core of the jets from the first and the second ducts. The areas of maximum noise emission are indicated with the numerals 36 and 37 for the first and the second duct. The outer line 38 confines the free jet. Somewhere near the numeral 39 lies the mixing area for the formation of the velocity according to free turbulence.

With the three-duct engine arranged in accordance with the present invention, the jet velocities from the first, second and third duct ($C_{D1}$, $C_{D2}$, $C_{D3}$) are selected per contour line 41 under approximate adaptation to the optimum jet profile 40 (FIG. 7) of the turbulent free jet. Accordingly, a notable decrease in jet noise from that commonly associated with two-duct engines of comparable performance is anticipated. This will become readily apparent especially from a study of the upper half of FIG. 7 which clearly illustrates the relatively drastic drops and thus deviations of the velocity profile from the ideal curve 40 of the turbulent free jet associated with two-duct engines.

The pressure ratio $II_D$ relating to contour line 41 (FIG. 6) will become apparent from the contour line 42 for the first, second and third duct.

As can be seen from FIGS. 5 and 6 and the equation at page 3, the jet noise for the three duct arrangement of the present invention will be substantially less than for a two duct arrangement with equivalent jet thrust due to the reduction of relative velocities at the added interface.

The invention further contemplates arrangements with more than three ducts, however the three duct arrangement is a preferred practical embodiment.

While I have shown and described several embodiments in accordance with the present invention, it is understood that the same is not limited thereto but also contemplates numerous changes and modifications as would be known to those skilled in the art given the present disclosure of the invention, and I therefore do not wish to be limited to the details shown and described herein but intend to cover all such changes and modifications as are encompassed by the scope of the appended claims.

I claim:

1. A turbojet engine comprising:
first fluid energizing means for energizing a first fluid stream,
second fluid energizing means for energizing a second fluid stream,
third fluid energizing means for energizing a third fluid stream,
first duct means for conducting said first fluid stream to a propulsion nozzle arrangement where said first fluid stream is discharged at a first jet velocity,
second duct means for conducting said second fluid stream to said propulsion nozzle arrangement where said second fluid stream is discharged in annular surrounding relationship to said first fluid stream and at a second jet velocity,
third duct means for conducting said third fluid stream to said propulsion nozzle arrangement where said third fluid stream is discharged in annular surrounding relationship to said second fluid stream and at a third jet velocity,
wherein said first jet velocity is greater than said second jet velocity and said second jet velocity is greater than said third jet velocity.
wherein said third fluid energizing means includes a radially outer portion of a first rotatable fan means arranged immediately upstream of inlet means to said third duct means, wherein said second fluid energizing means includes a second rotatable fan means arranged downstream of said first fan means and immediately upstream of inlet means of said second duct means, wherein flow into all of said duct means passes through said first fan means, wherein flow into only said first and second duct means passes through said second fan means, and wherein said first and second fan means operate at different rotational speeds with respect to one another.

2. A turbojet engine according to claim 1, wherein the relationship between said first, second and third jet velocities corresponds to an optimum velocity profile of the turbulent free jet formed downstream of the propulsion nozzle arrangement.

3. A turbojet engine according to claim 1, further comprising acoustic silencer means in at least one of said duct means.

4. A turbojet engine according to claim 3, wherein said acoustic silencer means are provided in both said second and third duct means.

5. A turbojet engine comprising:
first fluid energizing means for energizing a first fluid stream,
second fluid energizing means for energizing a second fluid stream,
third fluid energizing means for energizing a third fluid stream,
first duct means for conducting said first fluid stream to a propulsion nozzle arrangement where said first fluid stream is discharged at a first jet velocity,
second duct means for conducting said second fluid stream to said propulsion nozzle arrangement where said second fluid stream is discharged in annular surrounding relationship to said first fluid stream and at a second jet velocity,
third duct means for conducting said third fluid stream to said propulsion nozzle arrangement where said third fluid stream is discharged in annular surrounding relationship to said second fluid stream and at a third jet velocity,
wherein said first jet velocity is greater than said second jet velocity and said second jet velocity is greater than said third jet velocity,
wherein said first fluid energizing means includes combustion chamber means such that said first fluid stream includes hot combustion chamber exhaust products,
wherein said third fluid energizing means includes a radially outer portion of a first rotatable fan means arranged immediately upstream of inlet means to said third duct means, wherein said second fluid energizing means includes a second rotatable fan means arranged downstream of said first fan means and immediately upstream of inlet means of said second duct means, wherein flow into all of said duct means passes through said first fan means, wherein flow into only said first and second duct means passes through said second fan means, and wherein said first and second fan means operate at different rotational speeds with respect to one another.

6. A turbojet engine according to claim 5, wherein each of said second and third duct means are in bypassing relationship to said combustion chamber means.

7. A turbojet engine according to claim 6, wherein the relationship between said first, second and third jet velocities corresponds to an optimum velocity profile of the turbulent free jet formed downstream of the propulsion nozzle arrangement.

8. A turbojet engine according to claim 5, wherein said first and second fan means are arranged on separate shafts driven by separate turbines, and wherein said turbines are arranged downstream of said combustion chamber means and are driven by exhaust gas flow from said combustion chamber means.

9. A turbojet engine according to claim 7, wherein said first and second fan means are arranged on separate shafts driven by separate turbines, and wherein said turbines are arranged downstream of said combus-

10. A turbojet engine according to claim 8, wherein said second fan means is operatively drivingly unified with a compressor arranged immediately downstream thereof, and wherein flow into said first duct means passes through said compressor.

11. A turbojet engine according to claim 10, wherein said compressor is arranged immediately upstream of said combustion chamber means and supplies combustion air to said combustion chamber means.

12. A turbojet engine according to claim 5, wherein said first and second fan means are drivingly coupled to one another by reducer gear means.

13. A turbojet engine according to claim 5, wherein all of said duct means extend coaxially with the longitudinal centerline of the engine, and wherein said duct means exit from said propulsion nozzle arrangement in respective exit planes staggerd relative to one another in the longitudinal direction of the engine.

14. A turbojet engine according to claim 13, wherein the exit plane for said duct means is behind the exit plane for said second duct means and the exit plane for said second duct means is behind the exit plane for said third duct means in the direction of fluid flow through the propulsion nozzle arrangement.

15. A turbojet engine according to claim 14, wherein each of said second and third duct means are in bypassing relationship to said combustion chamber means.

16. A turbojet engine according to claim 14, wherein said first and second fan means are arranged on separate shafts driven by separate turbines, and wherein said turbines are arranged downstream of said combustion chamber means and are driven by exhaust gas flow from said combustion chamber means.

17. A turbojet engine according to claim 14, wherein said second fan means is operatively drivingly unified with a compressor arranged immediately downstream thereof, and wherein flow into said first duct means passes through said compressor.

18. A turbojet engine according to claim 5, further comprising acoustic silencer means positioned within each said second and third duct means and between the first and second fan means.

19. A turbojet engine according to claim 13, further comprising acoustic silencer means positioned within each of said second and third duct means and between the first and second fan means.

20. A turbojet engine according to claim 17, further comprising acoustic silencer means positioned within each of said second and third duct means and between the first and second fan means.

21. A turbojet engine according to claim 5, wherein fan blades of at least one of said fan means are provided with splitters extending coaxially with the engine centerline for radially separating differential axial flows caused by the configuration of the blades and supplied to respective ones of said duct means.

22. A turbojet engine according to claim 18, wherein fan blades of at least one of said fan means are provided with splitters extending coaxially with the engine centerline for radially separating differential axial flows caused by the configuration of the blades and supplied to respective ones of said duct means.

23. A turbojet engine according to claim 13, wherein fan blades of at least one of said fan means are provided with splitters extending coaxially with the engine centerline for radially separating differential axial flows caused by the configuration of the blades and supplied to respective ones of said duct means.

24. A turbojet engine according to claim 5, wherein said first fan means is provided with splitter means extending coaxially with the engine centerline for radially separating differential axial flows caused by the configuration of the blades of said first fan means and supplied to respective ones of said duct means, and wherein those portions of the blades of the first fan means which lie radially inwardly of said splitter means are aerodynamically inactive so as to cause no increase in pressure to the fluid flow therethrough.

25. A turbojet engine according to claim 24, wherein said splitter means is arranged at the junction between respective inlets to said third and second duct means.

26. A turbojet engine according to claim 7, wherein said first fan means is provided with splitter means extending coaxially with the engine centerline for radially separating differential axial flows caused by the configuration of the blades of said first fan means and supplied to respective ones of said duct means, and wherein those portions of the blades of the first fan means which lie radially inwardly of said splitter means are aerodynamically inactive so as to cause no increase in pressure to the fluid flow therethrough.

27. A turbojet engine according to claim 13, wherein said first fan means is provided with splitter means extending coaxially with the engine centerline for radially separating differential axial flows caused by the configuration of the blades of said first fan means and supplied to respective ones of said duct means, and wherein those portions of the blades of the first fan means which lie radially inwardly of said splitter means are aerodynamically inactive so as to cause no increase in pressure to the fluid flow therethrough.

28. A turbojet engine according to claim 5, wherein said first fan means is provided with splitter means extending coaxially with the engine centerline for radially separating differential axial flows caused by the configuration of the blades of said first fan means and supplied to respective ones of said duct means, and wherein those portions of the blades of the first fan means which lie radially inwardly of said splitter means are designed for a very moderate pressure ratio.

29. A turbojet engine according to claim 28, wherein said splitter means is arranged at the junction between respective inlets to said third and second duct means.

30. A turbojet engine according to claim 13, wherein said first fan means is provided with splitter means extending coaxially with the engine centerline for radially separating differential axial flows caused by the configuration of the blades of said first fan means and supplied to respective ones of said duct means, and wherein those portions of the blades of the first fan means which lie radially inwardly of said splitter means are designed for a very moderate pressure ratio.

31. A turbojet engine according to claim 5, wherein said first fan means is provided with splitter means extending coaxially with the engine centerline for radially separating differential axial flows caused by the configuration of the blades of said first fan means and supplied to respective ones of said duct means, and wherein those portions of the blades of the first fan means which lie radially inwardly of said splitter means are designed to keep the relative velocity through the throat area of the blade ducts at a relatively high mach number in the approximate range of 0.7 to 0.8 so as to dampen the noise.

32. A turbojet engine according to claim 31, wherein said splitter means is arranged at the junction between respective inlets to said third and second duct means.

33. A turbojet engine according to claim 7, wherein said first fan means is provided with splitter means extending coaxially with the engine centerline for radially separating differential axial flows caused by the configuration of the blades of said first fan means and supplied to respective ones of said duct means, and wherein those portions of the blades of the first fan means which lie radially inwardly of said splitter means are designed to keep the relative velocity through the throat area of the blade ducts at a relatively high mach number in the approximate range of 0.7 to 0.8 so as to dampen the noise.

34. A turbojet engine according to claim 13, wherein said first fan means is provided with splitter means extending coaxially with the engine centerline for radially separating differential axial flows caused by the configuration of the blades of said first fan means and supplied to respective ones of said duct means, and wherein those portions of the blades of the first fan means which lie radially inwardly of said splitter means are designed to keep the relative velocity through the throat area of the blade ducts at a relatively high mach number in the approximate range of 0.7 to 0.8 so as to dampen the noise.

35. A turbojet engine according to claim 18, wherein said first fan means is provided with splitter means extending coaxially with the engine centerline for radially separating differential axial flows caused by the configuration of the blades of said first fan means and supplied to respective ones of said duct means, and wherein those portions of the blades of the first fan means which lie radially inwardly of said splitter means are designed to keep the relative velocity through the throat area of the blade ducts at a relatively high mach number in the approximate range of 0.7 to0.8 so as to dampen the noise.

36. A turbojet engine according to claim 5, wherein said second fan means is formed by outer blade tips of a compressor arranged upstream of said combustion chamber means, and wherein a further compressor is arranged upstream of said combustion chamber means and downstream of said first mentioned compressor, and wherein three separate turbines drive respective ones of said first and second fan means and said further compressor by way of three concentric separately rotatable shafts.

37. A turbojet engine according to claim 5, wherein a multistage compressor is arranged downstream of said second fan means for compressing combustion air supplied to said combustion chamber means, and wherein three separate turbines drive respective ones of said first and second fan means and said multi-stage compressor by way of three concentric separately rotatable drive shafts.

38. A turbojet engine according to claim 5, wherein the pressure ratio in said second duct is greater than in said first duct.

* * * * *